United States Patent Office 3,819,830
Patented June 25, 1974

3,819,830
METHOD FOR TREATING DISEASES BY CO-ENZYME A AND ADENOSINE TRIPHOSPHATE AND COMPOSITION THEREFOR
Yoshio Yoshimura, Nishinomiya, Kanoo Hosoki, Toyonaka, Shigeru Kurooka, Fujiidera, and Kenichiro Iwamura, Tokyo, Japan, assignors to Dainippon Pharmaceutical Co., Ltd., Osaka, Japan
No Drawing. Filed June 23, 1972, Ser. No. 265,488
Claims priority, application Japan, July 1, 1971, 46/48,617
Int. Cl. A61k 19/00
U.S. Cl. 424—94        3 Claims

ABSTRACT OF THE DISCLOSURE

Method for treating diseases due to abnormal metabolism of lipids and carbohydrates, particularly fatty liver, more particularly diabetic fatty liver and alcoholic fatty liver by administering coenzyme A and adenosine triphosphate, and pharmaceutical composition therefor containing as the essential active ingredients coenzyme A and adenosine triphosphate and stable pharmaceutical composition containing calcium gluconate or calcium ascorbate as stabilizer.

---

The present invention relates to a novel method for treating diseases due to abnormal metabolism of lipids and carbohydrates in humans, and pharmaceutical compositions therefor. More particularly, it relates to a method for treating diseases due to abnormal metabolism of lipids and carbohydrates in humans by administering, in parenteral route, coenzyme A (hereinafter referred to as COA) and adenosine triphosphate (hereinafter referred to as ATP), and pharmaceutical compositions therefor containing CoA and ATP as the essential active ingredients.

Recently, numerous medical publications deal with such diseases due to abnormal metabolism of lipids as fatty liver and arteriosclerosis. The abnormal metabolism of lipids (which is) closely related to the abnormal metabolism of carbohydrates has been observed in many of cases with latent diabetes mellitus. The abnormality in lipids metabolism characterized by abnormal elevation of serum total cholesterol, $\beta$-lipoprotein and $\beta$-globulin fraction gives a symptom of so-called hyperlipidemia. The hyperlipidemia can be classified into five types according to lipoprotein patterns described by Fredrickson et al. (New England J. Med., vol. 276, pages 32, 1967). Their classifications are now widely used in convenience for treatment of various diseases due to abnormal metabolism of lipids and carbohydrates.

Several medicaments such as glutathione used for the treatment of these diseases have not so remarkable effect, and more effective medicaments are now desired to be developed. Thus, the present inventors have made our efforts to find useful therapeutic medicaments with potent preventive and curative effect against diseases due to abnormal metabolism of lipids and carbohydrates and have found that the CoA and ATP medicament shows a remarkable therapeutic effect on those diseases.

An object of the present invention is to treat diseases due to abnormal metabolism of lipids and carbohydrates by parenteral administration of CoA and ATP medicament to the patients.

Another object of the invention is, for the treatment of diseases due to abnormal metabolism of lipids and carbohydrates, to provide a pharmaceutical composition containing CoA and ATP as the essential active ingredients.

Further object of the invention is, for treating diseases due to abnormal metabolism of lipids and carbohydrates, to provide a stable pharmaceutical composition containing CoA and ATP as the essential active ingredients and calcium gluconate or calcium ascorbate as a stabilizer.

These and other objects of the invention will be apparent from the detailed description hereinafter described.

According to the present invention, the CoA and ATP medicament is administered in parenteral route to patients with such diseases due to abnormal metabolism of lipids and carbohydrates, especially as fatty liver, e.g. diabetic fatty liver, alcoholic fatty liver, dietary fatty liver and fatty liver induced by drugs.

In the present invention CoA may be employed as its free acid and its salt with such an alkali metal as sodium or potassium, and ATP may be employed as its free acid and its salt with such an alkali metal as sodium or potassium.

These CoA and ATP medicaments are administered in parenteral route, i.e. intravenously, intramuscularly or subcutaneously to those patients after dissolving them in such an aqueous medium as water, physiological salt solution, sorbitol solution, mannitol solution or buffer solutions, e.g. isotonic phosphate buffer or acetate buffer. CoA or ATP may be preserved in combination or separately. They are usually administered preferably together after dissolving them in the same solution, but may also be administered separately after dissolving them in different solutions.

The pharmaceutical composition of the present invention contains CoA and ATP as the essential active ingredients and is usually in a form of lyophilized products which are readily dissolved in the solutions when used. The lyophilized products are readily prepared by dissolving CoA and ATP in water and then lyophilizing.

The CoA and ATP medicaments are unstable to heat and moisture, and therefore, when they are preserved at a room temperature for a long period, their activities are gradually lost. However the composition containing comparatively large amount of CoA is comparatively stable, and the composition is preferably preserved in a refrigerator after lyophilization.

It has been studied to find out more stable pharmaceutical composition and have found that such ingredients as calcium gluconate or calcium ascorbate stabilized CoA and ATP.

In the present invention, for the preparation of the stable pharmaceutical composition, CoA, ATP and calcium gluconate or calcium ascorbate are dissolved in water and then the solution is lyophilized. The proportion of the stabilizer is preferably about 1 to 4 moles against 1 mole of CoA.

The pharmaceutical composition thus obtained is stable to both heat and hygroscopicity, and therefore can be preserved at a room temperature or at 40° C. for a long period without losing their activities.

The composition of the present invention is dissolved in an aqueous medium, such as water, physiological salt solution, isotonic solution, sorbitol solution, mannitol solution or buffer solution when they are used. The pH of those solutions thus obtained is preferably in a range of about 3 to 7, more preferably about 4 to 6 to avoid such side effects as a pain at the injection sites. Such solution as phosphate or acetate buffer is preferably used to adjust the pH range.

Although the dosage of CoA and ATP are optionally determined according to the symptoms of patients, the dosage of CoA is usually in the range of about 1 to 100 mg., preferably about 5 to 20 mg. per day and the dosage of ATP is in the range of about 1 to 100 mg., preferably about 5 to 40 mg. per day in adult. The present pharmaceutical composition may be prepared so as to contain about 1 to about 100 mg., preferably about 5 to 20 mg.

of CoA per daily dosage unit and about 1 to 100 mg., preferably about 5 to 40 mg. of ATP per daily dosage unit.

The composition according to the present invention has therapeutic effects on various diseases due to abnormal metabolism of lipids and carbohydrates, particularly fatty liver, such as diabetic fatty liver, alcoholic fatty liver, dietary fatty liver and drug-induced fatty liver. More particularly, the composition of the present invention is especially useful for the treatment of diabetic fatty liver and alcoholic fatty liver.

The following Examples illustrate the present invention.

EXAMPLE 1

In 5 ml. of water were dissolved 40 mg. of CoA and 100 mg. of disodium ATP, and the mixture was made germ free by passing through a Millipore filter (made by Millipore Corporation, U.S.A.). Each 0.5 ml. of the solution thus obtained was added into 2 ml. ampoule and lyophilized to give a pharmaceutical composition containing 4 mg. of CoA and 10 mg. of disodium ATP. Into the ampoule is added about 2 ml. of water to dissolve the ingredients when used.

EXAMPLE 2

In 5 ml. of water were dissolved 40 mg. of CoA and 150 mg. of disodium ATP, and in the solution was further dissolved 45 mg. of calcium gluconate. After sterilizing, each 0.5 ml. of the solution was added into 2 ml. ampoule and lyophilized to give a stable pharmaceutical composition containing 4 mg. and 15 mg. of CoA and disodium ATP, respectively.

EXAMPLE 3

In 5 ml. of water were dissolved 40 mg. of CoA and 150 mg. of disodium ATP and in the solution was further dissolved 41 mg. of calcium ascorbate. After sterilizing, each 0.5 ml. of the solution was added into 2 ml. ampoule and lyophilized to give a stable pharmaceutical composition.

Test of stability

On the stable pharmaceutical composition obtained by Examples 2 and 3, the stability was tested. As a control there was used a composition of CoA and disodium ATP containing no stabilizer. The compositions to be tested were preserved in an incubator of 40° C. for 3 months and the change of activities of CoA and ATP was measured. The activity of CoA was measured by phosphotransacetylase method (E. R. Stadtman: J. Biological Chemistry, Vol. 191, page 365, 1951) and the activity of ATP was measured by hexokinase-glucose-6-phosphate-dehydrogenase method (H. U, Bergmeyer: Methods of Enzymatic Analysis, page 543, 1965). The results are shown in Table I.

unit), GPT (59.5 Kamen unit) and cholinesterase activities were slightly elevated. Brom Sulphalein test (BSP test) showed 13.4% at 30 minutes and 6.8% at 45 minutes, suggesting retarded hepatic excretion function. Levels of total cholesterol (228 mg./dl.), β-lipoprotein (5 mm.) and β-globulin (16.1%) were also higher than the normal. Blood glucose level in fasted condition was 103 mg./dl., while glucose tolerance test, upon loading 50 g. of glucose, was abnormal, being 98 mg./dl. before loading, maximum 180 mg./dl. after 60 minutes, and 152 mg./dl. after 120 minutes, indicating the latent diabetes mellitus. Laparoscopic examination showed a typical sign of fatty hepatitis. The patient was classified into the fatty liver type with latent diabetes and abnormal glycolysis, characterized by the elevated serum cholesterol, β-lipoprotein and β-globulin in serum protein fraction.

Medical Treatment and The Results

Treatment with CoA or ATP only

The patient was injected intramuscularly with 8 mg. of CoA daily. A marked decrease in serum total cholesterol and β-lipoprotein was observed within 4 weeks. GOT and GPT activities were also normalized and BSP test showed improvement, however upon further prolongation of the treatment, those improvements were again worsened. Treatment with ATP (30 mg./day, intramuscular injection) could not improve the worsened conditions.

Treatment with CoA and ATP together

The patient was then treated with 8 mg. of CoA and 30 mg. of ATP in combination, daily for 3 months by intramuscular injection, during which serum analysis indicated gradual improvement with lapse of time and complete improvement after 3 months. Laparoscopic and histological examinations of the liver have confirmed that the deposited fat in the hepatic cells before treatment had disappeared 3 months after the treatment with the combined preparation of CoA and ATP. Serum analysis and histological examination of the liver at this stage have shown that the fatty liver had been completely cured. According to the periodical diagnosis by serum analysis and histological examination after one year from stopping the administration of CoA and ATP, the patient has been completely recovered from the fatty liver disease. A part of the results is summarized in Table II.

TABLE II

|  | Before treatment | Treatment for— | |
| --- | --- | --- | --- |
|  |  | 3 months | 6 months |
| Serum total cholesterol (mg./dl.) | 254 | 222 | 200 |
| β-Lipoprotein (mm.) | 5.0 | 4.7 | 2.5 |
| Biopsy, state of the liver | (¹) | (²) | (³) |

¹ Fatty liver.
² Remarkable improvement.
³ Complete cure.

TABLE I

| Stabilizer | Ingredient | Remaining activity (percent) | | | |
| --- | --- | --- | --- | --- | --- |
| | | Before preservation | After preservation | | |
| | | | 1 month | 2 months | 3 months |
| Calcium gluconate | ATP | 100 | 95.0 | 95.0 | 93.3 |
|  | CoA | 100 | 95.3 | 96.0 | 91.3 |
| Calcium ascorbate | ATP | 100 | 95.0 | 95.0 | 94.3 |
|  | CoA | 100 | 98.3 | 96.0 | 94.3 |
| Control | ATP | 100 | 57.0 | 48.9 | 43.2 |
|  | CoA | 100 | 60.5 | 45.0 | 38.0 |

EXAMPLE 4

Clinical Trials

Case 1.—Patient: A 37-year-old man, 164 cm. in height and 71 kg. in body weight, had a main discomfort of general fatigue, but showed no sign of jaundice, anemia and abnormal abdominal touch at the part of liver. Serum alkaline phosphatase (9.4 K-A units) activity, colloidal reaction test, basal metabolic rate, protein-iodine binding test, and urinalysis showed normality. GOT (50.5 Kamen Cases 2 to 8: Seven male patients with fatty hepatitis similar to case 1 were treated daily by intramuscular injection of CoA and ATP-preparation for 3.5 to 6 months and the effect of the preparation was observed by measuring serum total cholesterol, β-lipoprotein, β-globulin, GOT, GPT and cholinesterase. The results are shown in Tables III to VIII. As made clear from these results, it was found that these values which had been high before treatment have been lowered in all cases after the treatment, thereby the effectiveness of the combined preparation of CoA and ATP against the fatty hepatitis was confirmed. Laparoscopic and histological examination of their livers also proved that the fatty livers before treatment have been cured after the treatment.

TABLE III

Serum total cholesterol (mg./dl.)

| Patients age | Before treatment | Treatment for— | |
|---|---|---|---|
| | | 3 months | 6 months |
| 49 | 240 | 200 | 200 |
| 30 | 205 | 198 | 183 |
| 29 | 222 | 184 | 182 |
| 32 | 210 | 184 | 175 |
| 39 | 218 | 200 | 176 |
| 39 | 196 | 183 | 175 |
| 39 | 210 | 190 | 185 |

TABLE IV

β-Lipoprotein (mm.)

| Patients age | Before treatment | Treatment for— | |
|---|---|---|---|
| | | 3 months | 6 months |
| 49 | 3.2 | 2.9 | 2.2 |
| 30 | 3.2 | 2.7 | 2.2 |
| 29 | 2.5 | 2.0 | 2.0 |
| 32 | 4.0 | 2.6 | 1.8 |
| 39 | 5.0 | 3.0 | 2.5 |
| 39 | 3.6 | 2.3 | 2.0 |
| 39 | 3.0 | 2.2 | 2.2 |

TABLE V

β-Globulin (percent)

| Patients age | Before treatment | Treatment for— | |
|---|---|---|---|
| | | 3 months | 6 months |
| 49 | 12.8 | 13.3 | 13.5 |
| 30 | 15.0 | 10.0 | 9.2 |
| 29 | 13.0 | 11.0 | 10.3 |
| 32 | 12.5 | 11.8 | 11.0 |
| 39 | 15.6 | 12.4 | 11.0 |
| 39 | 10.2 | 9.7 | 9.7 |
| 39 | 13.5 | 12.5 | 12.0 |

TABLE VI

GOT (Kamen unit)

| Patients age | Before treatment | Treatment for— | |
|---|---|---|---|
| | | 3 months | 6 months |
| 49 | 42 | 15 | 17 |
| 30 | 38 | 25 | 26 |
| 29 | 50 | 26 | 18 |
| 32 | 42 | 30 | 16 |
| 39 | 47 | 48 | 32 |
| 39 | 76 | 35 | 16 |
| 39 | 70 | 35 | 25 |

TABLE VII

GPT (Kamen unit)

| Patients age | Before treatment | Treatment for— | |
|---|---|---|---|
| | | 3 months | 6 months |
| 49 | 40 | 16 | 10 |
| 30 | 47 | 38 | 18 |
| 29 | 82 | 34 | 28 |
| 32 | 46 | 20 | 20 |
| 39 | 75 | 66 | 47 |
| 39 | 62 | 25 | 18 |
| 39 | 102 | 52 | 32 |

LABLE VIII

Cholinesterase (ΔpH)

| Patients age | Before treatment | Treatment for— | |
|---|---|---|---|
| | | 3 months | 6 months |
| 49 | 1.05 | 0.90 | 0.90 |
| 30 | 1.35 | 1.00 | 0.90 |
| 29 | 1.20 | 1.05 | 0.90 |
| 32 | 1.60 | 1.35 | 1.05 |
| 39 | 1.15 | 0.80 | 0.60 |
| 39 | 0.90 | 0.70 | 0.80 |
| 39 | 1.10 | 1.10 | 0.90 |

Case 9.—Patient: A 28-year-old woman had a fatty hepatocirrhosis and showed abnormal abdominal touch at the part of liver, but showed no sign of jaundice and anemia. Urea urobilin showed normality. The patient had drunk 100 to 180 ml./day of whisky for 10 years. Serum analysis was as follows: ESR 15 mm./hour; serum total cholesterol 237 mg./dl.; cholesterol ester 76.3%; β-lipoprotein 3.9 mm.; cholinesterase 0.94; total protein 9.0 g./dl.; albumin/globulin 0.93; β-globulin 13.5%; γ-globulin 25.6%; BSP test 8% at 45 minutes; GOT 63 Kamen unit; GPT 65 Kamen unit; TTT 2.9; ZnTT 8.9; and serum iron 91 μg./dl.

Treatment with CoA and ATP together

The patient was treated with 8 mg. of CoA and 20 mg. of ATP in combination, daily for 6 months by intramuscular injection.

Serum analysis after treatment for 3 months was as follows: serum total cholesterol 193.8 mg./dl.; cholesterol ester 72.9%; β-lipoprotein 2.7 mm.; cholinesterase 0.91; total protein 8.0 g./dl.; albumin/globulin 1.13; β-globulin 13.0%; γ-globulin 21.3%; BSP test 6% at 45 minutes; GOT 30 Kamen unit; GPT 10 Kamen unit; TTT 1.8; ZnTT 4.4; and serum iron 103 μg./dl.

Serum analysis after treatment for 6 months was as follows: serum toral cholesterol 226 mg./dl.; cholesterol ester 65.2%; β-lipoprotein 2.5 mm.; cholinesterase 0.88; total protein 8.8 g./dl.; albumin/globulin 1.36; β-globulin 8.9%; γ-globulin 18.0%; BSP test 3% at 45 minutes; COT 23 Kamen unit; GPT 25 Kamen unit; TTT 1.9; ZnTT 6.4; and serum iron 120 μg./dl.

As shown above, serum analysis indicated significant improvement after treatment with CoA and ATP together. Laparoscopic and histological examination of the liver also proved that the fatty liver had been significantly improved after treatment.

Case 10.—Patient: A 46-year-old man had a hepatic function disorder and showed abnormal abdominal touch at the part of liver, but showed no sign of jaundice and anemia. Urea urobilin showed normality. The patient had drunk about 900 ml./day of Japanese wine since about 20 years old. Serum analysis was as follows: ESR 11 mm./hour; serum total cholesterol 207 mg./dl.; cholesterol ester 75.5%; β-lipoprotein 3.9 mm.; cholinesterase 0.84; total protein 9.0 g./dl.; albumin/globulin 1.09; β-globulin 13.2%; γ-globulin 22.6%; BSP test 9% at 45 minutes; GOT 74 Kamen unit; GPT 72 Kamen unit; TTT 5.0; ZnTT 10.3; serum iron 247 μg./dl.; and blood glucose level in fasted condition 116 mg./dl.

Treatment with CoA and ATP together

The patient was treated with 8 mg. of CoA and 20 mg. of ATP in combination, daily for 6 months by intramuscular injection.

Serum analysis after treatment for 3 months was as follows: serum total cholesterol 181 mg./dl.; cholesterol ester 71.2%; β-lipoprotein 2.8 mm.; cholinesterase 0.66; total protein 8.6 g./dl.; albumin/globulin 0.78; β-globulin 11.4%; γ-globulin 27.9%; BSP test 4% at 45 minutes; GOT 66 Kamen unit; GPT 445 Kamen unit; TTT 4.4; ZnTT 11.5; and serum iron 149 μg./dl.

Serum analysis after treatment for 6 months was as follows: serum total cholesterol 170 mg./dl.; cholesterol ester 66.7%; β-lipoprotein 2.7 mm.; cholinesterase 0.82;

total protein 8.2 g./dl.; albumin/globulin 1.02; β-globulin 12.4%; γ-globulin 21.6%; BSP test 3% at 45 minutes; GOT 84 Kamen unit; GPT 56 Kamen unit; TTT 4.2; ZnTT 12.5; and serum iron 146 μg./dl.

As shown above, serum analysis indicated significant improvement after treatment with CoA and ATP together.

What we claim is:
1. A method for treating fatty liver in humans which comprises
   parenterally administering 5 to 20 mg. per day of co-enzyme A and
   5 to 40 mg. per day of adenosine triphosphate to a patient afflicted with fatty liver disease.
2. The method of claim 1, wherein the fatty liver is diabetic fatty liver.
3. The method of claim 1, wherein the fatty liver is alcoholic fatty liver.

References Cited

UNITED STATES PATENTS 2,917,434   12/1959   Robilliart _____ 424—94

OTHER REFERENCES

Chemical Abstracts, vol. 65, entry 7876d–h, 1966.

Garth, Dissertation Abstracts, vol. 24, No. 12, p. 4970, 1964.

Merck Index, 7th ed., published by Merck & Co., Inc., Rahway, N.J., 1960, p. 21.

RICHARD L. HUFF, Primary Examiner

U.S. Cl. X.R.

424—180